US009407659B2

(12) United States Patent
Dobbins et al.

(10) Patent No.: US 9,407,659 B2
(45) Date of Patent: Aug. 2, 2016

(54) PROTECTING COMPUTING ASSETS FROM RESOURCE INTENSIVE QUERYING ATTACKS

(71) Applicant: Arbor Networks, Inc., Burlington, MA (US)

(72) Inventors: Ellis Roland Dobbins, Sarasota, FL (US); Alexandru G. Bardas, Manhattan, KS (US); Marc R. Eisenbarth, Ann Arbor, MI (US)

(73) Assignee: Arbor Networks, Inc., Burlington, MA (US)

( * ) Notice: Subject to any disclaimer, the term of this patent is extended or adjusted under 35 U.S.C. 154(b) by 0 days.

(21) Appl. No.: 14/259,970

(22) Filed: Apr. 23, 2014

(65) Prior Publication Data
US 2015/0312272 A1 Oct. 29, 2015

(51) Int. Cl.
*H04L 29/06* (2006.01)

(52) U.S. Cl.
CPC ......... *H04L 63/1458* (2013.01); *H04L 63/1433* (2013.01)

(58) Field of Classification Search
USPC .......................................................... 726/12
See application file for complete search history.

(56) References Cited

U.S. PATENT DOCUMENTS

| 7,339,914 | B2 * | 3/2008 | Bhagwat | H04L 12/2602 370/338 |
| 8,582,567 | B2 * | 11/2013 | Kurapati | H04L 29/06027 370/352 |
| 8,689,328 | B2 * | 4/2014 | Ormazabal | H04L 63/123 726/22 |

(Continued)

OTHER PUBLICATIONS

Andersson, Stig; Clark, Andrew; Mohay, George; Schatz, Bradley; Zimmerman, Jacob. A Framework for Detecting Network-based Code Injectioin Attacks Targeting Windows and Unix. 21st Annual Computer Security Applications Conference (ACSAC '05). Pub. 2005. http://ieeexplore.ieee.org/stamp/stamp.jsp?tp=&arnumber=1565234.*

(Continued)

*Primary Examiner* — Jeremiah Avery
(74) *Attorney, Agent, or Firm* — Locke Lord LLP; Scott D. Wofsy; Christopher J. Capelli

(57) ABSTRACT

A method and system for managing data traffic and protecting computing assets. The method and system includes intercepting queries and messages, such as EDNS0 queries, and sending probe queries and reply queries to the originating computing device to determine whether the originating computing device may be sufficiently validated so as to justify forwarding resource-intensive queries and messages to the targeted computing device.

14 Claims, 3 Drawing Sheets

(56) References Cited

U.S. PATENT DOCUMENTS

| | | | | |
|---|---|---|---|---|
| 2004/0250158 | A1* | 12/2004 | Le Pennec | H04L 41/28 714/4.1 |
| 2007/0097976 | A1* | 5/2007 | Wood | H04L 63/1416 370/392 |
| 2007/0121596 | A1* | 5/2007 | Kurapati | H04L 29/06027 370/356 |
| 2007/0266426 | A1* | 11/2007 | Iyengar | H04L 9/3213 726/5 |
| 2008/0028463 | A1* | 1/2008 | Dagon | H04L 29/12066 726/22 |
| 2009/0288157 | A1* | 11/2009 | Pacella | H04L 63/1441 726/12 |
| 2009/0307485 | A1* | 12/2009 | Weniger | H04L 63/1458 713/153 |
| 2011/0214157 | A1* | 9/2011 | Korsunsky | G06F 21/55 726/1 |
| 2012/0117621 | A1* | 5/2012 | Kondamuru | H04L 29/12066 726/3 |

OTHER PUBLICATIONS

Lua, Eng Keong; Crowcroft, Jon; Pias, Marcelo; Sharma, Ravi; Lim, Steven. A Survey and Comparision of Peer-To-Peer Overlay Network Schemes. IEEE Communications Surveys & Tutorials. vol. 7 Issue: 2. Pub. Date: 2005. http://ieeexplore.ieee.org/stamp/stamp.jsp?tp=&arnumber=1610546.*

Wang, Haining; Zhang, Danlu; Shin, Kang G. Detecting SYN Flooding Attacks. Proceedings, Twenty-First Annual Joint Conference of the IEEE Computer and Communications Societies. INFOCOM 2002. vol. 3. Pub. Date: 2002. http://ieeexplore.ieee.org/stamp/stamp.jsp?tp=&arnumber=1019404.*

* cited by examiner

PROTECTING COMPUTING ASSETS FROM RESOURCE INTENSIVE QUERYING ATTACKS

FIELD OF THE INVENTION

The present invention relates to protecting networks, and more particularly, to protecting computing assets from denial of service attacks utilizing higher-capability resource-intensive queries and messages.

BACKGROUND OF THE INVENTION

As businesses become increasingly dependent on computerized communications, businesses concurrently become increasingly vulnerable to attacks on the underlying computer infrastructure. One such type of attack is a denial of service (DOS) attack that may be predicated upon utilizing higher-capability computer-intensive queries and messages.

Accordingly, there is an unmet need to protect computing assets from attacks predicated on resource-intensive queries, such as Extended DNS: version 0 (EDNS0) queries.

SUMMARY OF THE INVENTION

The purpose and advantages of the below described illustrated embodiments will be set forth in and apparent from the description that follows. Additional advantages of the illustrated embodiments will be realized and attained by the devices, systems, and methods particularly pointed out in the written description and the claims herein, as well as from the drawings.

To achieve these and other advantages and in accordance with the purpose of the illustrated embodiments, described herein are systems and methods for protecting computing assets from a denial of service attack predicted on resource intensive queries. In one embodiment, a proxy is placed between a server and devices that may send queries. Preferably the proxy is located "outside" the firewall, so as to also protect the firewall, but it is contemplated herein that the computing proxy device may be placed anywhere in the communication path(s). The proxy analyzes queries, such as EDNS0 queries, by sending replies to the querying device, and the querying device's responses inform the analysis as to whether this attack is showing characteristics consistent with a denial of service attack. Based on these considerations, malevolent communications and/or computing devices may be identified, blocked and/or black listed.

BRIEF DESCRIPTION OF THE DRAWINGS

So that those having ordinary skill in the art, to which the present embodiments pertain, will more readily understand how to employ the novel system and methods, certain illustrated embodiments thereof will be described in detail hereinbelow with reference to the drawings, wherein.

DETAILED DESCRIPTION OF CERTAIN EMBODIMENTS

Figure 1:
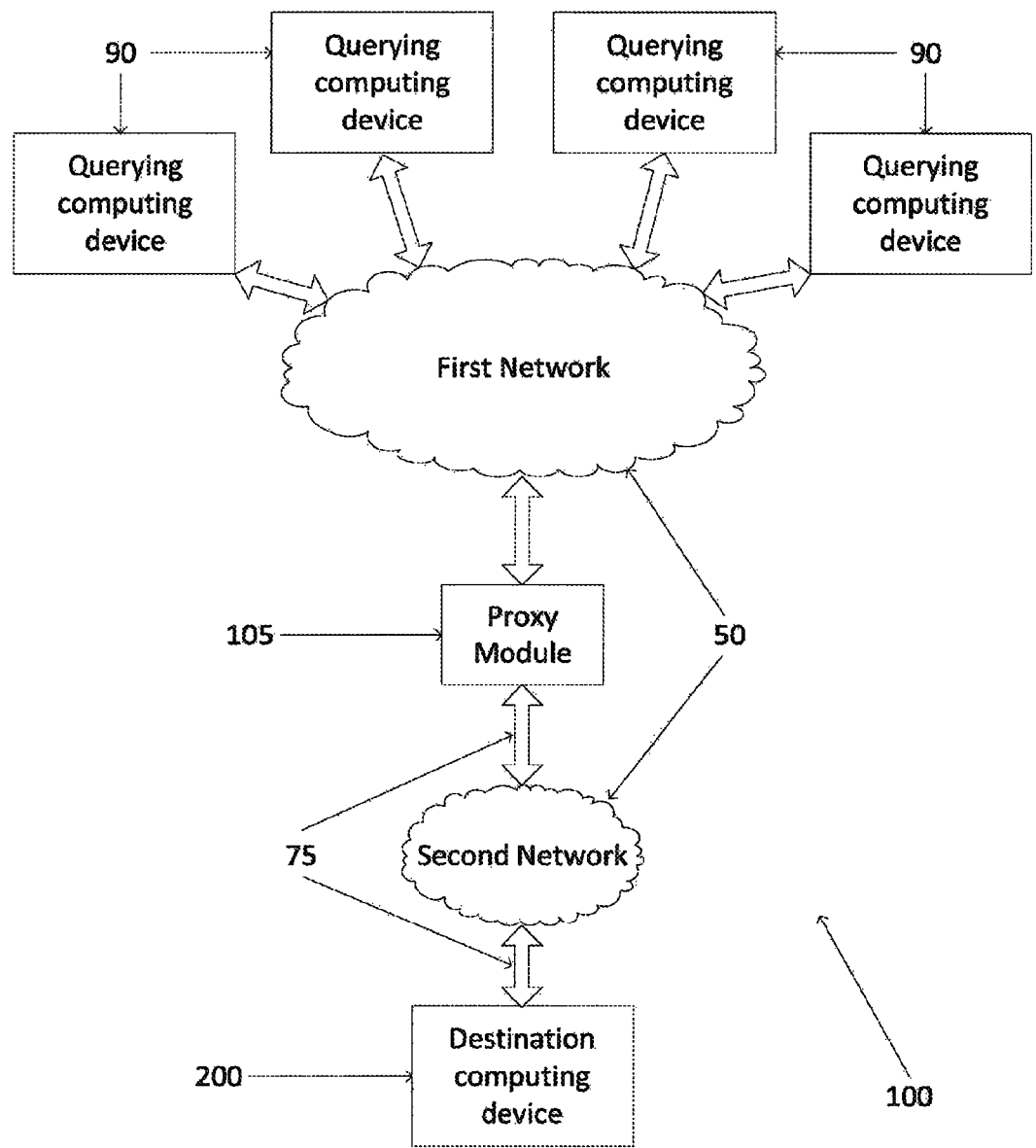
FIG. 1 illustrates a system diagram of an exemplary embodiment of a system for protecting computing assets from denial of service attacks.

The below illustrated embodiments are directed to systems and methods for managing network traffic by identifying and blocking denial of service (DOS) attacks, such as distributed denial of service (DDOS) attacks, predicated upon resource-intensive queries, such as EDNS0 queries. It is to be appreciated the below illustrated embodiments are not limited in any way to what is shown, as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the certain illustrated embodiments. Also, the flow charts and methods described herein do not imply either required steps or a required order to the steps, and the illustrated embodiments and processes may be implemented in any order and/or combination that is practicable.

Unless defined otherwise, all technical and scientific terms used herein have the same meaning as commonly understood by one of ordinary skill in the art relating to the below illustrated embodiments. Although any methods and materials similar or equivalent to those described herein can also be used in the practice or testing of the below illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" may include a plurality of such stimuli and reference to "the signal" may include reference to one or more signals and equivalents thereof as known to those skilled in the art.

It is to be appreciated the certain embodiments described herein may be utilized in conjunction with a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be executed by a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the certain embodiments described herein. Thus the certain embodiments are not to be understood to be limited by what has been particularly shown and described, except as indicated by the appended claims.

The methods and systems described herein allow users to, in an exemplary use, monitor network traffic to protect one or more computing assets from Denial Of Service (DOS) attacks, such as Distributed Denial Of Service (DDOS) attacks, that are predicated upon higher-capability queries, such as EDNS0 queries. The detection of higher-capability queries may be performed by sending replies to the querying computing device, and based on the content of the querying node's responses, or the lack of responses, identifying whether the higher-capability query may be a part of a DOS attack. Based on these identifications, communications from computers sending such queries may be blocked and/or black listed (e.g., all communications from the offending computer are blocked, all communications from the offending computer's network are blocked, and/or the offending computer's IP is communicated to other networks to enable those networks to also block communications from the offending computer and/or its network).

Referring to FIG. 1, a hardware diagram depicting an environment 100 in which the processes described herein can be executed is provided for exemplary purposes. In one embodiment, environment 100 includes proxy module 105, networks 50, communications 75, querying computing devices 90, and destination computing device 200.

Figure 2:
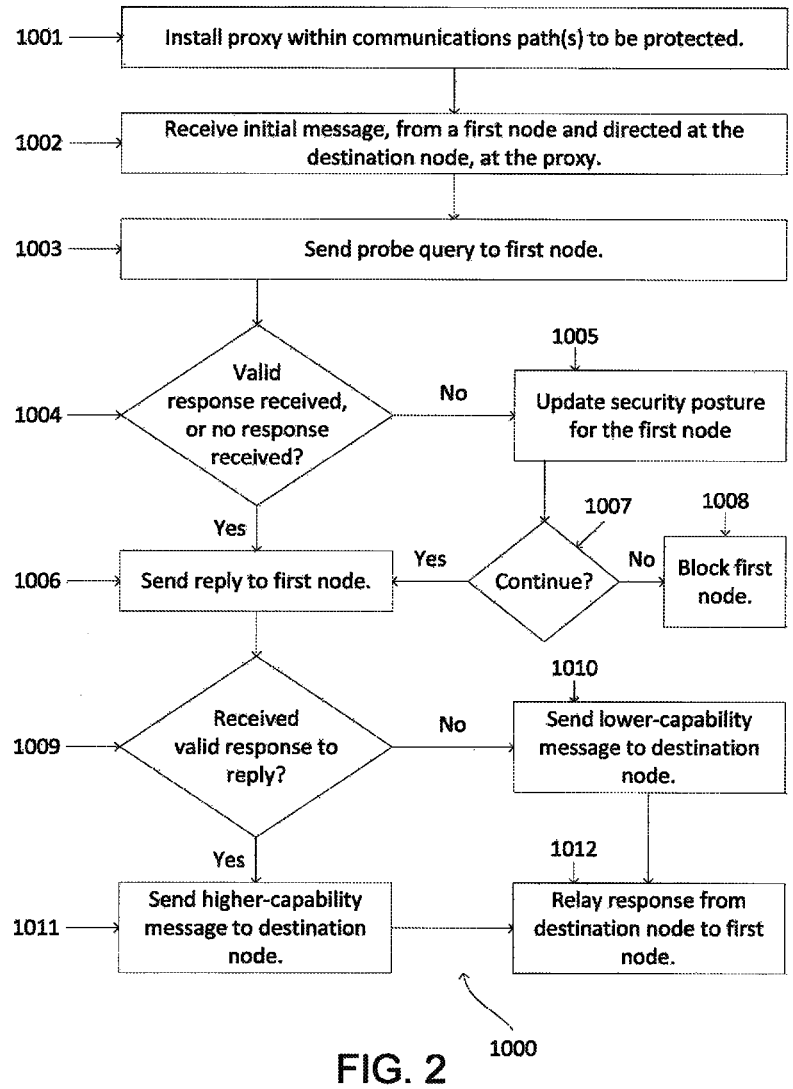
FIG. 2 is a flow chart illustrating an exemplary use of the embodiment of FIG. 1.

Turning to FIG. 2, illustrated therein is in an exemplary process 1000 of utilizing proxy module 105. Starting at step 1001, proxy module 105 is installed on one or more communication paths to be protected (best shown in FIG. 1, where proxy module 105 is placed between querying computing devices 90 and destination computing device 200). It is contemplated herein that proxy module 105 may be placed anywhere along the communications path, including for exemplary purposes only and without limitation, "behind" the firewall (the term "behind" being from the perspective of the network that the firewall is protecting; in other words, in this scenario proxy module 105 is placed on the same side of the firewall as the rest of the network), "in front of" the firewall (should be self-explanatory in light of the previous parenthetical), within the firewall (e.g., as a piece of software, firmware and/or any computing instructions that may execute within the firewall to provide the functionality and/or methods described herein), "in front of" the modem and/or device communicating with the Internet Service Provider (ISP) (e.g., within the ISP's network, at the border between the ISP and the modem), and/or within the modem and/or device communicating with the ISP. It is further contemplated herein that, for exemplary purposes only and without limitation, proxy module 105 may be implemented on a separate piece of hardware that only executes the embodiments and methods described herein, and/or as software and/or firmware that executes on electronics that do and/or may provide other functionality (e.g., a firewall, a modem).

Subsequently, an initial message, sent by a first node (e.g., querying computing device 90) and directed at the destination node (e.g., destination computing device 200), is received at proxy module 105 (step 1002). In reply a probe query is sent from the probe module 105 to the first node (step 1003). For example, if the initial message was an EDNS0 request, in one or more embodiments the probe query may comprise or consist of a DNS query for a domain that the destination node is an authoritative domain name server for, such as the domain referenced in the initial message, and the first node may be, for exemplary purposes, a server that may be a forwarding (recursive) server.

If an invalid response is received (step 1004), the security posture of the first node is updated (step 1005). For example, if the initial message was a DNS query, an invalid response may include the first node returning the probe query. In this situation, it can be identified that the first node is an open forwarding (recursive) server, and therefore the first node's security posture may be updated (step 1005), and subsequently, it is determined (step 1007) whether to continue via step 1006, or whether to block communications from the first node (step 1008).

If a valid response is received (step 1004), and it is contemplated herein that in one or more embodiments a "valid response" may include the first node not sending any response, then a reply message is sent to the first node (step 1006). For example, if the communications were initiated by a DNS request, such as an EDNS0 request, a valid response may be an NXDOMAIN response such as is described in RFC 1035, wherein the RCODE field contains a value of 3 (three) and continuing the DNS example, the reply message sent to the first node may be a NOTIMP packet, for example such as is described in RFC 1035, "Domain Name Implementation and Specification," wherein the RCODE field contains a value of 4 (four). Thus, in one or more embodiments, when proxy module 105 is protecting against EDNS0 attacks, a "valid response" may include an NXDOMAIN response or no response.

If first node does not send a valid response (step 1009) to the reply message, then a lower-capability message may be sent to the destination node (step 1010) and the destination node's reply may be relayed to the first node (step 1012). However, if the first node does send a valid response (step 1009), then a higher-capability message may be sent to the destination node (step 1011) and the destination node's replay may be related to the first node (step 1012).

For exemplary purposes only and without limitation, and continuing with the DNS exemplary process, if the initial message was an EDNS0 request, the reply message sent to the first node may be a NOTIMPL message, and a valid response from first node may be a non-EDNS0 query. In this situation, the first node has validated itself, at least to an extent, and thus proxy module 105 will forward an EDNS0 query to destination server 200, and destination server's 200 response to the EDNS0 query is forwarded back to the first node.

However, and continuing with the example, if the reply message is not a non-EDNS0 request (e.g., another EDNS0 request), then the first node has not validated itself, and thus proxy module 105 will forward a non-EDNS0 query to destination server 200, and destination server's 200 response to the non-EDNS0 query is forwarded back to the first node.

For one or more embodiments described herein, a possible advantage presented in utilizing the systems and methods described herein is that the destination server is spared from more computer-intensive queries (e.g., EDNS0 queries as opposed to non-EDNS0 queries) unless the first node has validated itself (e.g., by submitted a valid response to the probe query (step 1004) and/or the reply message (step 1009)).

It is contemplated herein that, instead of sending a lower-capability message to the destination node, proxy module 105 may update the security profile for the first node (such as is described in step 1005), and selectively decide whether first node will receive any response and/or be blocked, permanently or temporarily.

Figure 3:
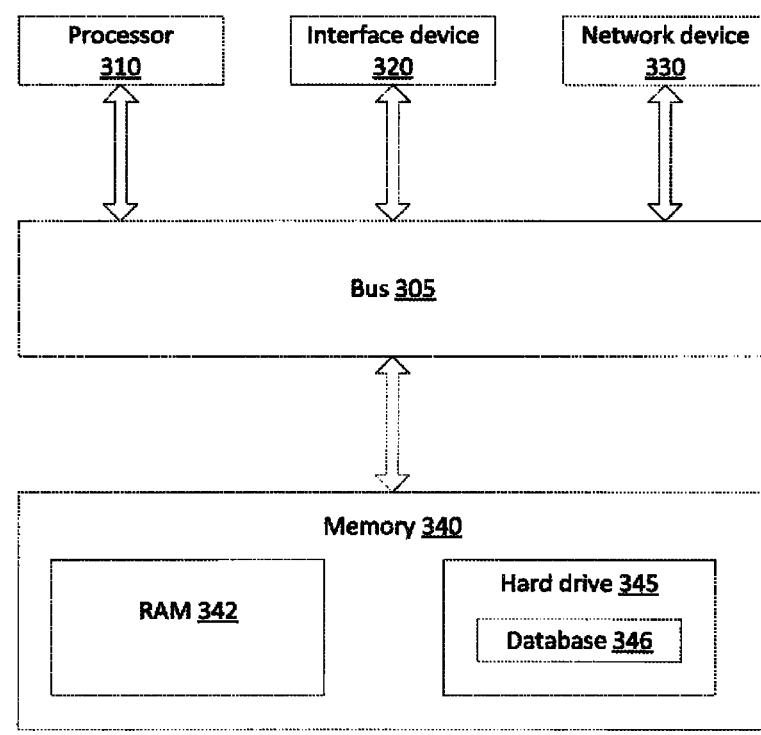
FIG. 3 is an illustration of an embodiment of a computing device.

Turning now to FIG. 3, illustrated therein is an exemplary embodiment of computing device 300 that preferably includes bus 305, over which intra-device communications preferably travel, processor 310, interface device 320, network device 330, and memory 340, which preferably includes RAM 342 and hard drive 345 and database 346. In FIG. 1, proxy module 105, destination device 200 and querying computing devices 90 preferably include computing device 300 and the components thereof.

The term "module"/"engine" is used herein to denote a functional operation that may be embodied either as a stand-alone component or as an integrated configuration of a plurality of subordinate components. Thus, "modules"/"engines" may be implemented as a single module or as a plurality of modules that operate in cooperation with one another. Moreover, although "modules"/"engines" may be described herein as being implemented as software, they could be implemented in any of hardware (e.g. electronic circuitry), firmware, software, or a combination thereof.

Memory 340 is a computer-readable medium encoded with a computer program. Memory 340 stores data and instructions that are readable and executable by processor 310 for controlling the operation of processor 310. Memory 340 may be implemented in random access memory 342 (RAM), a non-transitory computer readable medium, volatile or non-volatile memory, solid state storage devices, magnetic devices, hard drive 345, database 346, a read only memory (ROM), or a combination thereof.

Processor 310 is an electronic device configured of logic circuitry that responds to and executes instructions. Processor 310 outputs results of an execution of the methods described herein. Alternatively, processor 310 could direct the output to a remote device (not shown) via network(s) 50.

It is to be further appreciated that networks 50 depicted in FIG. 1 can include a local area network (LAN) and a wide area network (WAN), other networks such as a personal area network (PAN), or any combination thereof. Further, each network 50 in FIG. 1 may include the exact same network configurations, completely different network configurations, or any combination thereof. Such networking environments are commonplace in offices, enterprise-wide computer networks, intranets, and the Internet. For instance, when used in a LAN networking environment, the proxy module 105 is connected to the LAN through a network interface or adapter (not shown). When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to proxy module 105, or portions thereof, may be stored in a remote memory storage device such as storage medium. It is to be appreciated that the illustrated network connections of FIG. 1 are exemplary and other means of establishing a communications link between multiple computers may be used.

It should be understood that computing devices 300 each generally include at least one processor, at least one interface, and at least one memory device coupled via buses. Computing devices 300 may be capable of being coupled together, coupled to peripheral devices, and input/output devices. Computing devices 300 are represented in the drawings as standalone devices, but are not limited to such. Each can be coupled to other devices in a distributed processing environment.

Although the embodiments related to DNS queries refer to Extended DNS: version 0 (EDNS0), it is contemplated herein that the functionality described herein could be applied to any version of higher-capability DNS queries that may be developed and/or implemented.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprise", "include", and conjugations thereof are to be interpreted as specifying the presence of the stated features, integers, steps or components, but not precluding the presence of one or more other features, integers, steps or components or groups thereof.

Although the systems and methods of the subject invention have been described with respect to the embodiments disclosed above, those skilled in the art will readily appreciate that changes and modifications may be made thereto without departing from the spirit and scope of the subject invention as defined by the appended claims.

What is claimed is:

1. A computer-implemented method of defending against a Denial of Service (DoS) attack comprising:
   receiving an initial message at a proxy, the initial message being sent from a first node to a destination node, the first and destination nodes being computing devices;
   sending a probe message from the proxy to the first node;
   determining a security posture of the first node based on the first node's response to the probe message; and
   based upon the first node's security posture, controlling communication between the first node and the destination node based on a security protocol to defend against the DoS attack, the control of communication including:
      in response to determination of a first security posture, allowing higher-capability messages from the first node to reach the destination node;
      in response to determination of a second security posture, blocking all messages from the first node to the destination node; and
      in response to determination of a third security posture, allowing only lower-capability messages from the first node to the destination node, wherein this security protocol includes the step of representing to the first node that the destination node is only capable of receiving and processing lower-capability messages.

2. The computer-implemented method of claim 1, wherein the destination node is running a program that is configured to participate in a bidirectional communications relationship with the first node, and wherein the probe message is configured to generate a response from the first node.

3. The computer-implemented method of claim 2, wherein the step of determining a security posture of the first node comprises:
   identifying the first node as not being configured in an insecure manner when at least one of the following conditions is met:
      the first node does not respond to the probe message; and
      the first node sends a valid response to the probe message that indicates that the first node is securely configured.

4. The computer-implemented method of claim 3, wherein the first node's valid response comprises a lower-capability message that was sent in response to the probe message, and wherein the probe message indicates that at least one of the proxy and the destination node is incapable of interacting with higher-capability messages, the method further comprising sending the initial message, from the proxy to the destination node, in response to receiving the lower-capability message from the first node, and wherein the initial message is a higher-capability message.

5. The computer-implemented method of claim 2, wherein the step of determining the security posture of the first node comprises:
   receiving a response to the probe message, from the first node, which does not indicate that the first node is configured to process lower-capability messages; and
   identifying the first node as having an insecure configuration based on the first node's response.

6. The computer-implemented method of claim 5, wherein, when the first node has been identified as being insecurely configured, the method further comprises initiating a security protocol that blocks communications from the first node.

7. The computer-implemented method of claim 5, wherein both the proxy and the destination nodes are configured to process higher-capability messages, and wherein, when the first node has been identified as being insecurely configured, the method further comprises:
   sending a response to the first node, the response indicating that at least one of the proxy and destination nodes are not configured to process higher-capability messages; and
   sending a lower-capability message to the destination node.

8. The computer-implemented method of claim 1, wherein the destination node is an authoritative name server for a domain, and wherein the initial message comprises an Extended DNS: version 0 (EDNS0) query regarding the domain.

9. The computer-implemented method of claim 8, wherein the probe message comprises an Internet Protocol (IP) address query regarding the domain.

10. The computer-implemented method of claim 9, wherein the step of determining a security posture of the first node comprises:
   identifying the first node as not being a forwarding recursive server if at least one of the following conditions is met:
      the first node does not respond to the probe message; and
      the first node sends a response to the probe message that includes a code representing a NXDOMAIN response.

11. The computer-implemented method of claim 10, wherein, when the first node has been identified as not being a forwarding recursive server, the method further comprises:
   sending a NOTIMPL DNS response to the first node, wherein both the proxy and the destination nodes are EDNS0-enabled;
   receiving a non-EDNS0 query from the first node; and
   subsequent to receiving the non-EDNS0 query, sending an EDNS0 query to the destination node.

12. The computer-implemented method of claim 9, wherein the step of determining a security posture of the first node comprises identifying the first node as a forwarding recursive server if the first node sends a response to the probe message that does not include a code representing a NXDOMAIN response.

13. The computer-implemented method of claim 12, wherein, when the first node has been identified as being a forwarding recursive server, the method further comprises blocking communications from the first node.

14. The computer-implemented method of claim 12, wherein, when the first node has been identified as being a forwarding recursive server, the method further comprises:
   sending a NOTIMPL DNS response to the first node, wherein both the proxy and the authoritative name server are EDNS0-enabled; and
   sending a non-EDNS0 query to the destination node.

* * * * *